United States Patent
Yi (10) Patent No.: US 7,130,398 B2
(45) Date of Patent: Oct. 31, 2006

(54) METHOD AND APPARATUS FOR MANAGING SIGNALING LINKS IN A SIGNALING LINK SET

(75) Inventor: Seung Hee Yi, Anyang-shi (KR)

(73) Assignee: LG-Nortel Co., Ltd., Seoul (KR)

( * ) Notice: Subject to any disclaimer, the term of this patent is extended or adjusted under 35 U.S.C. 154(b) by 738 days.

(21) Appl. No.: 10/423,918

(22) Filed: Apr. 28, 2003

(65) Prior Publication Data

US 2003/0206562 A1 Nov. 6, 2003

(30) Foreign Application Priority Data

May 3, 2002 (KR) .................. 10-2002-0024370

(51) Int. Cl.
*H04M 15/00* (2006.01)
(52) U.S. Cl. .................. 379/114.07; 370/227; 370/228; 370/522
(58) Field of Classification Search .................. None
See application file for complete search history.

(56) References Cited

U.S. PATENT DOCUMENTS 5,235,599 A * 8/1993 Nishimura et al. ............ 714/4
5,539,884 A * 7/1996 Robrock, II ................. 709/227
5,848,069 A 12/1998 Milne et al. ................. 370/426
6,327,270 B1 12/2001 Christie et al. ............. 370/469
6,487,286 B1 11/2002 Reaves et al. ........... 379/221.1
7,068,773 B1 * 6/2006 McCann et al. ............ 379/229

* cited by examiner

*Primary Examiner*—Creighton Smith
(74) *Attorney, Agent, or Firm*—Fleshner & Kim LLP (57) ABSTRACT

A method and apparatus for managing signaling links in a signaling link set accommodates a plurality of signaling links having different data link formats in a signaling link set connecting adjacent signaling points. The method is preferably one which manages signaling links a signaling system No. 7 (SS7) network. This method includes adding one or more signaling links having different data link formats to a signaling link set of the SS7 network, and processing signal message transfer between adjacent signaling points through one or more main signaling links which have superior bandwidth compared with the added links. Through this method, it is possible to make a natural development of a signaling network possible, boost stability of signaling network by diversifying media for transfer simultaneously, and get economic effects in constructing a signaling network through re-using data links used previously.

34 Claims, 5 Drawing Sheets

METHOD AND APPARATUS FOR MANAGING SIGNALING LINKS IN A SIGNALING LINK SET

BACKGROUND OF THE INVENTION

1. Field of the Invention

The present invention relates to a method and apparatus for managing signaling links in a signaling link set.

2. Background of the Related Art

Figure 1:
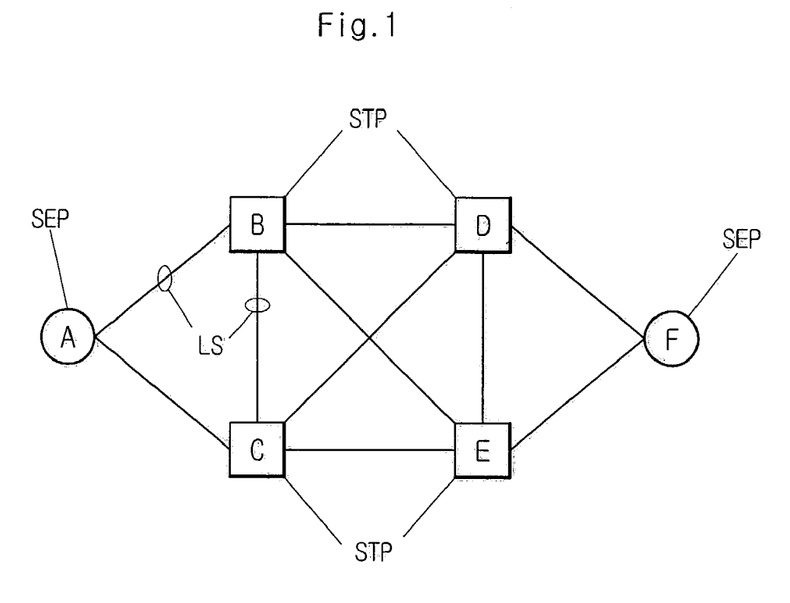
FIG. 1 illustrates the structure of a SS7 network.

A signaling system No. 7 (SS7) is a common channel signaling system that transmits a plurality of voice signals through separate channels by separating a talking path from a signaling path completely. An SS7 network, as illustrated in FIG. 1, includes a plurality of signaling points including a signaling end point (SEP) that handles outgoing or incoming of signal messages, a signaling transfer point (STP) that transmits signal messages, and a signaling link (SL) that is a logical information transmission line connecting the signaling points.

A set of signaling links (SL) is designated as a signaling link set (LS) and an SEP is classified into an originating point (OP) generating signal messages and a destination point (DP) that is a destination of signal messages.

In a signaling system No. 7 network, one signaling point may make up one signaling link set with an adjacent signaling point. At this time, one signaling link set may accommodate 16 signaling links at most and the signaling link set may only accommodate signaling links having the same kind of data link format.

Figure 2:
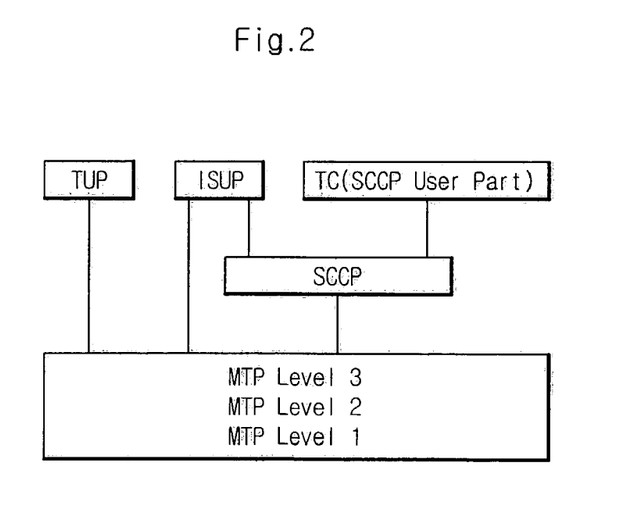
FIG. 2 illustrates the structure of protocol of each signaling point in the SS7 network.

Referring to FIG. 2, the protocol structure of each signaling point in the SS7 network includes a message transfer part (MTP) level 1 to MTP level 3 performing a signaling data link function and a signal message transferring and processing function; and an MTP user part level 4, an user part using functions provided by the MTP such as a signaling connection control part (SCCP), a telephone user part (TUP), an integrated services digital network (ISDN) user part (ISUP) and etc. The MTP performs a function of transferring signal messages of the MTP user part through signaling links and is classified into level 1 designating physical, electrical and mechanical characteristics of data links; level 2 performing functions of transferring signal messages, controlling flow of signal messages, detecting errors and monitoring signaling links; and level 3 which performs signal message processing and managing functions.

The MTP level 3 includes a signal message processing part performing a signaling traffic transferring function and an user part message distributing function. MTP level 3 also includes a signaling network managing part which efficiently uses every component of the signaling network (such as signaling links, signaling link sets and signaling points) to transfer signal messages with high reliability, maintain stable relationship between components of the signaling network, and perform signaling network configuration managing functions.

In the SS7 network, if signal messages to be transferred exist at a signaling point, the signaling point transfers the signal messages to an adjacent signaling point through available signaling links in a signaling link set, which connects the signaling point and the adjacent signaling point. The adjacent signaling point, which receives the signal messages through the available signaling link in the signaling link set, transfers the signal messages to another adjacent signaling point through available signaling links in another signaling link set. Until the signal messages are transferred to a destination point, the signal messages are transferred in the above-mentioned way.

Figure 3:
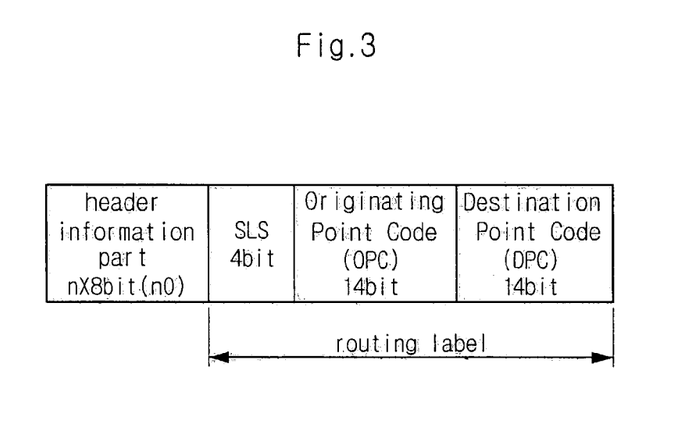
FIG. 3 illustrates a routing label included in signal messages transferred between signaling points in the SS7 network.
Figure 4:
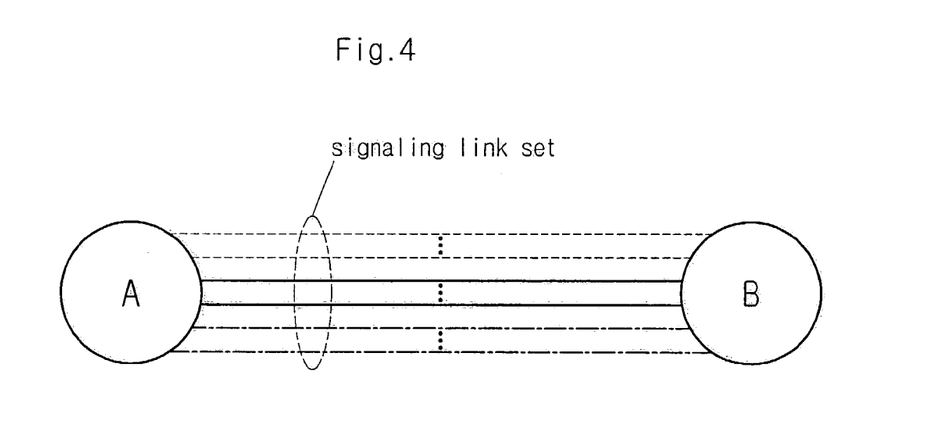
FIG. 4 illustrates the structure of a signaling link set, which accommodates a plurality of signaling links having different data link formats, in a SS7 network according to a preferred embodiment of the present invention.

In the end, the signal messages are transferred to the destination point. The signal message transfer is performed at the signal message processing part of the MTP level 3 using header information included in each signal message which is designated as a routing label. More specifically, the signal message processing part transfers the signal messages to the destination point using the routing label which includes a signaling link selection (SLS), an originating point code (OPC) and a destination point code (DPC) of the signal messages, as illustrated in FIG. 3.

In the SS7 network, if a plurality of signaling links are available in a signaling link set connecting signaling points, signal messages may be transferred through the available signaling links. Accordingly, if data links of signaling links transferring the signal messages are different, a transfer order of the signal messages may not be assured at the destination point of the signal messages. Thus, it is impossible for a signaling link set of the SS7 network to accommodate data links having different signal message transfer methods and different signal message transfer quantities (e.g., different MTP level 1 and level 2) together.

The SS7 network is generally used for call set up and call release in a signaling network for mobile communication. In order to perform call set up and call release in the SS7 network, each signaling point transfers and receives signal messages according to a predetermined scenario. If different data links are accommodated by one signaling link set, a transfer order of signal messages may not be assured. Thus, it is possible to implement different data links in a signaling link set in terms of hardware technology but it is impossible to simultaneously use signaling links having different data link formats in one signaling link set in terms of transferring short messages.

As information to be transferred between signaling points in the SS7 network increases due to the advent of next generation mobile communication system such as IMT-2000, it is preferable to connect each signaling point with data links that have broader bandwidth. Nonetheless, it is impossible for one signaling link set of the SS7 network in the related art to accommodate different data links having different bandwidths. Consequently, new data links having higher bandwidth must be configured after removing every data link used in the signaling link set. The SS7 network of the related art thus has problems in that natural development of signaling networks may not be achieved. Moreover, configuring the developed signaling networks is not economical because data links used prior to the development of signaling networks may not be used.

Consider for example, the case where a signaling link set includes data links of 64 kbps. If an E1 data link of 2.048 Mbps is required due to a request for processing more signal messages, all signaling links of the signaling link set should be replaced in order to add the data link of 2.048 Mbps, without accommodating the data links of 64 kbps. Thus, there is a problem in the related art that great expenses are needed for development of the signaling network.

SUMMARY OF THE INVENTION

An object of the invention is to solve at least the above problems and/or disadvantages and to provide at least the advantages described hereinafter.

An object of the present invention is to accommodate a plurality of signaling links having different data link formats in a signaling link set of an SS7 network, and to use the signaling links having the different data link formats for signal message transfer by using an inhibiting function and an uninhibiting function when necessary.

Another object of the present invention is to configure a SS7 network adding signaling links having new data link formats without removing data links previously used, by accommodating a plurality of signaling links having different data link formats in a signaling link set of the SS7 network and by using the signaling links for signal message transfer.

Another object of the present invention is to make a natural development of a signaling network possible, to boost stability of signaling network by diversifying media for transfer and simultaneously to get economic effects in constructing a signaling network through re-using data links used previously, by adding signaling links having new data link formats when necessary without removing data links used previously.

In order to achieve at least the above objects, in whole or in parts, there is provided a method of managing signaling links in a signaling link set of a SS7 network including: adding signaling links having different data link formats to a signaling link set of the SS7 network and activating the signaling links; and processing signal message transfer between adjacent signaling points through main signaling links having superior bandwidth among the signaling links having different data link formats.

Preferably, the method of managing signaling links in a signaling link set of a SS7 network further includes checking whether new signaling links may be added, in order to add signaling links having different data link formats in the signaling link set, by checking the number of signaling links accommodated in the signaling link set; and inhibiting auxiliary signaling links having data link formats not currently used for signal message transfer among the signaling links having different data link formats.

Preferably, the auxiliary signaling link is a signaling link to be used for signal message transfer between adjacent signaling points by being uninhibited when all main signaling links become unavailable.

Preferably, the method of managing signaling links in a signaling link set of a SS7 network further includes: if failure happens at main signaling links while signal message transfer between adjacent signaling points is processed, checking whether an available main signaling link having the same data link format as a data format of the main signaling link exists; and, in a case where the available main signaling link exists, processing signal message transfer between adjacent signaling points by sharing the signal messages among the available main signaling links.

Preferably, the method of managing signaling links in a signaling link set of a SS7 network further includes: if failure happens at main signaling link while signal message transfer between signaling points is processed through the main signaling link, stopping signal message transfer trial through the main signaling link; and, in a case where available main signaling links having the same data link format as a data link format of the main signaling link at which failure happens do not exist, signal message transfer between the adjacent signaling points is processed by uninhibiting the auxiliary signaling links.

Preferably, for uninhibiting the auxiliary signaling links, if a plurality of auxiliary signaling links exists, an auxiliary signaling link having comparatively high bandwidth among the plurality of auxiliary signaling links is uninhibited.

Preferably, the method of managing signaling links in a signaling link set of a SS7 network further includes: if failure happens at the auxiliary signaling links while signal message transfer between adjacent signaling points is processed through auxiliary signaling links, stopping signal message transfer trial through the auxiliary signaling links; checking whether available auxiliary signaling links having the same data link format as a data link format of the auxiliary signaling links at which failure happens exist; and, in a case where the available auxiliary signaling links exist, processing signal message transfer between adjacent signaling points by sharing the signal messages among the available auxiliary signaling links.

Preferably, the method of managing signaling links in a signaling link set of a SS7 network further includes: if failure recovery at main signaling links or auxiliary signaling links having comparatively high bandwidth is detected while signal message transfer between the adjacent signaling points is processed through the auxiliary signaling links among which the signal messages are shared, stopping signal message transfer trial by inhibiting the auxiliary signaling links among which the signal messages are shared; and processing signal message transfer between adjacent signaling points through the main signaling links or the auxiliary signaling links of which failure is recovered.

Preferably, the method of managing signaling links in a signaling link set of a SS7 network further includes: if failure happens at auxiliary signaling links while signal message transfer between adjacent signaling points is processed through the main signaling links, performing a link failure process making the auxiliary signaling links unavailable.

Preferably, the method of managing signaling links in a signaling link set of a SS7 network further includes: if failure recovery at a certain signaling link is detected while signal message transfer between adjacent signaling points is processed, checking whether the signaling link of which failure is recovered is a main signaling link or an auxiliary signaling link; in a case where the signaling link of which failure is recovered is a main signaling link, performing a failure recovery process and checking whether the failure recovery is the first recovery at the main signaling link; and, in a case where the failure recovery is the first recovery at the main signaling link, inhibiting the auxiliary signaling link currently used for signal message transfer and processing signal message transfer between adjacent signaling points through the main signaling link of which failure is recovered.

Preferably, the method of managing signaling links in a signaling link set of a SS7 network further includes: if failure recovery at a certain signaling link is detected while signal message transfer between the adjacent signaling points is processed, checking whether the signaling link of which failure is recovered is a main signaling link or an auxiliary signaling link; in a case where the signaling link of which failure is recovered is a main signaling link, performing a failure recovery process and checking whether a signaling link currently used for signal message transfer is an auxiliary signaling link; and, in a case where the signaling link currently used for signal message transfer is an auxiliary signaling link, inhibiting the auxiliary signaling link and processing signal message transfer between the adjacent signaling points through the main signaling link of which failure is recovered.

Preferably, the method of managing signaling links in a signaling link set of a SS7 network further includes: in a case where the signaling link of which failure is recovered is an auxiliary signaling link, performing a failure recovery process making the auxiliary signaling link available.

In order to achieve at least the above objects, in whole or in parts, for a SS7 network including a signal message processing part performing signal message routing, signal message discriminating and signal message distributing functions, there is provided a system for managing signaling links in a signaling link set of a SS7 network including: a different data links processing part performing a function for managing a plurality of signaling links, having different data link formats, accommodated in a signaling link set used for signal message transfer between adjacent signaling points; and a signaling network managing part adding signaling links having different data link formats to the signaling link set, activating the added signaling links, performing an inhibiting function and an uninhibiting function for signaling links having a certain data link format by cooperating with the different data links processing part and performing a failure processing function for signaling links used for signal message transfer between adjacent signaling points.

Preferably, the different data links processing part performs a signaling link checking function checking whether a signaling link has a data link format to be inhibited; and a failure information managing function for signaling links used for signal message transfer.

The different data links processing part manages signaling link format information needed for performing the signaling link checking function checking whether a signaling link has a data link format to be inhibited; information about sort of signaling link currently used for signal message transfer; and signaling link status information needed for performing the failure information managing function.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a SS7 network according to a preferred embodiment of the present invention, a plurality of signaling links having different data link formats are accommodated in a signaling link set connecting two adjacent signaling points (A, B). Among signaling links accommodated in the signaling link set, signaling links having a certain data link format (preferably, a data link format of a superior bandwidth, namely, a data link format of comparatively high bandwidth) are activated into an available status and the other signaling links having another data link format are inhibited. Accordingly, the signaling links activated into an available status are operated for signal message transfer.

In accordance with the preferred embodiment, the signaling link set may be configured with a plurality of signaling links to continuously perform signal message transfer through other signaling links, even though signaling links currently used for signal message transfer become unavailable due to failure that occurs at the signaling links. Also, the signaling link set may be configured with a plurality of signaling links to share the load of the signaling link used for signal message transfer by transferring the signal messages through the plurality of signaling links.

In a SS7 network which includes a signaling link set accommodating a plurality of signaling links having different data link formats according to the preferred embodiment of the present invention, signaling links having a data link format which will be mainly used (preferably, main signaling links having a data link format of comparatively high bandwidth) are activated to transfer signal messages. If failure happens at all main signaling links, signal message transfer is continuously performed by uninhibiting one auxiliary signaling link (preferably, a signaling link having a data link format of comparatively high bandwidth among auxiliary signaling links) without operations of a signaling network manager.

Figure 5:
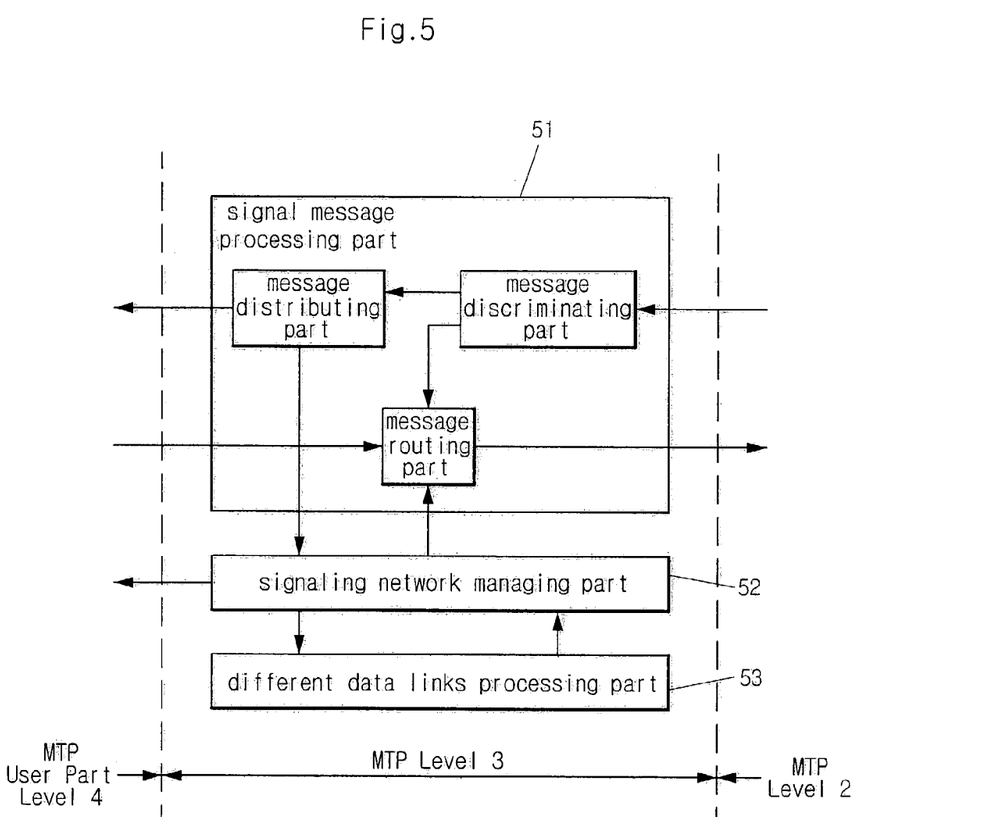
FIG. 5 illustrates function blocks of MTP level 3 for managing a plurality of signaling links, having different data link formats, accommodated in one signaling link set in the SS7 network according to the preferred embodiment of the present invention.

According to the preferred embodiment of the present invention for managing a plurality of signaling links having different data link formats, the protocol structure of each signaling point in the SS7 network is preferably the same as the protocol structure in the related art illustrated in FIG. 2. However, according to the preferred embodiment of the present invention as shown in FIG. 5, an MTP level 3 further includes a different data links processing part 53 for accommodating and operating a plurality of signaling links having different data link formats using inhibiting and uninhibiting functions (namely, for managing different data link formats), in addition to a signal message processing part 51 and a signaling network managing part 52.

The signal message processing part 51 performs signal message routing, signal message discriminating, and signal message distributing functions. The signaling network managing part 52 maintains a stable relationship between components of the signaling network such as signaling links, signaling link sets, signaling points and signaling routes, and performs signaling network configuration managing functions. The signaling network managing part 52 also performs signaling link inhibiting, signaling link uninhibiting and failure processing functions by co-operating with the different data links processing part 53, if a signaling link set accommodates a plurality of signaling links having different data link formats.

The different data links processing part 53 preferably performs at least three functions: a function for managing information about a plurality of signaling links accommodated in a signaling link set having different data link formats; a signaling link checking function for checking signaling links having a data link format to be inhibited; and a function for managing failure information including information about status of signaling links having a data link format used for signal message transfer. In other words, the different data links processing part 53 performs a function for managing information about a plurality of signaling links having different data link formats. The information managed by the different data links processing part 53 includes signaling link format (the first format of signaling link/the second format of signaling link) information needed for performing a signaling link checking function for checking signaling links having data link format to be inhibited; information about sort of signaling link which is currently used for signal message transfer; and signaling link status (available/unavailable) information needed for performing a failure information managing function.

The signaling link inhibiting function preferably includes a function for excluding some signaling links in signal message transfer of an MTP user part in terms of management and maintenance of signaling links (e.g., some available signaling links are deliberately not used for practical signal message transfer of the MTP user part) when more than 2 signaling links are available among a plurality of signaling links accommodated in one signaling link set.

In the SS7 network according to the preferred embodiment of the present invention, one signaling link set accommodates a plurality of signaling links having different data link formats. By inhibiting signaling links having other data link formats except signaling links having a certain data link format while the signaling links in one signaling link set are activated, it is possible to transfer signal messages through signaling links having the data link format which is not inhibited.

If failure happens at the signaling links used for signal message transfer, other available signaling links having the same data link format takes over the signal message transfer and the signal messages are continuously transferred through the available signaling links.

If failure happens at the signaling links used for signal message transfer and all signaling links having the same data link format are unavailable, signaling links having another data link format, signaling links having data link format of comparatively high bandwidth among inhibited signaling links, are uninhibited and the signal messages are transferred through the uninhibited available signaling links.

Figure 6:
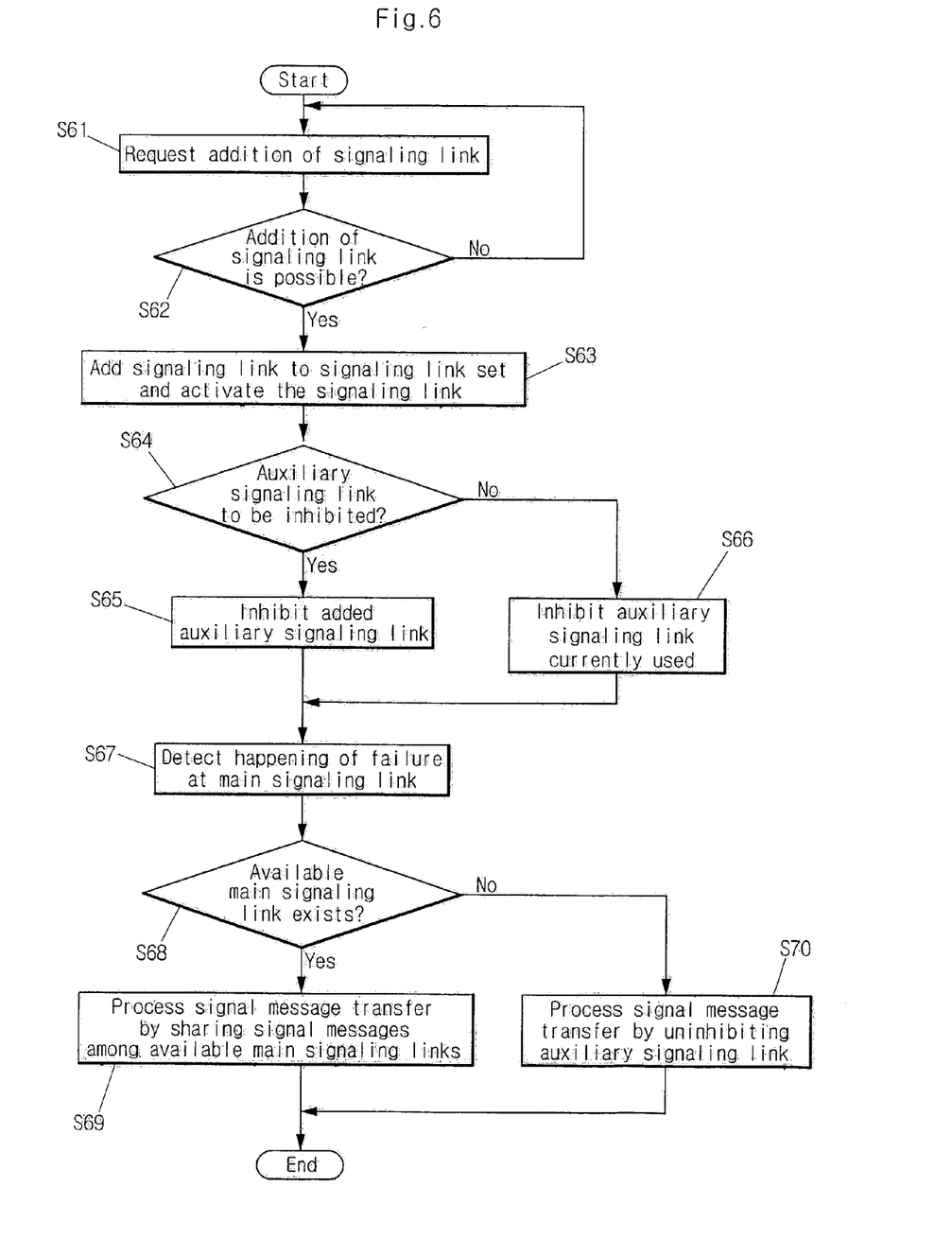
FIG. 6 illustrates a flow diagram of operations for managing the plurality of signaling links having different data links accommodated in one signaling link set in the SS7 network according to the preferred embodiment of the present invention.

FIG. 6 shows operations, performed at MTP level 3, for managing the plurality of signaling links having different data link formats accommodated in one signaling link set in the SS7 network according to the preferred embodiment of the present invention.

First, if a system operator requests addition of one or more signaling links having at least one different data link format to a signaling link set designated for configuring a signaling network between adjacent signaling points, a signaling network managing part 52 checks whether maximum signaling links (for example, 16 signaling links) are accommodated in the signaling link set. Whether the addition of other signaling links having a different data link format is possible may be performed by counting the number of signaling links that are already accommodated in the signaling link set.

When addition of one or more signaling links having at least one different data link format is possible, the signaling network managing part 52 adds signaling links having the different data link format(s), that the system operator intends to add, to the signaling link set and activates the added signaling links, thereby enabling signal message transfer (S63).

After the signaling link(s) having different data link format(s) are added to the signaling link set, the signaling network managing part 52 confirms that the added signaling links are auxiliary signaling links (e.g., signaling links having data link format to be inhibited (S64)), by asking a different data links processing part 53 whether the newly added signaling link(s) have a comparatively high bandwidth compared with signaling links currently used for signal message transfer. This may be performed by determining whether the newly added signaling links are main signaling links which will be mainly used for signal message transfer or auxiliary signaling links.

If the added signaling links are checked to be auxiliary signaling links having data link format to be inhibited according to results of said asking which received from the different data links processing part 53, the signaling network managing part 52 keeps processing signal message transfer through main signaling links currently used for signal message transfer by inhibiting the added signaling links, auxiliary signaling links (S65).

However, if the added signaling links are checked not to be auxiliary signaling links, (e.g., the added signaling links are checked to be main signaling links), the signaling network management part 52 processes signal message transfer through the added signaling links by inhibiting auxiliary signaling links, signaling links currently used for signal message transfer (S66).

Thereafter, if failure is detected at main signaling links while signal message transfer is processed through main signaling links (S67), the signaling network managing part 52 immediately stops signal message transfer trial through main signaling links at which failure happens, performs procedures for protection of loss and disorder of signal messages and checks whether available main signaling links exist by asking the different data links processing part 53 whether all main signaling links are unavailable (S68).

If it is confirmed that available main signaling links exist according to the result of said checking at the step S68, signal messages are continuously transferred through the available main signaling links by sharing the signal messages among the available signaling links (S69).

However, if it is confirmed that available main signaling links do not exist, (e.g., failure happens at all main signaling links and the main signaling links are unavailable according to the result of said checking at the step S68), signal messages are continuously transferred through available auxiliary signaling links by uninhibiting auxiliary signaling links in an inhibited status (S70).

For performing a procedure of uninhibiting auxiliary signaling links in an inhibited status in order to process signal message transfer through available auxiliary signaling links, if a plurality of signaling links having different data link formats exist and all main signaling links are unavailable, signal messages are transferred through auxiliary signaling links having comparatively high bandwidth among available auxiliary signaling links by uninhibiting the auxiliary signaling links having comparatively high bandwidth.

If failure is detected at auxiliary signaling links in an inhibited status while signal message transfer between adjacent signaling points is processed through main signaling links at the step S67, or if failure is detected at other auxiliary signaling links in an inhibited status while signal message transfer between adjacent signaling points is processed through auxiliary signaling links at the step S70, no influence on signal message transfer exists. Accordingly, a signaling link failure processing procedure, which makes auxiliary signaling links at which failure happens unavailable, is performed.

If failure is detected at auxiliary signaling links currently used for signal message transfer while signal message transfer is processed through the auxiliary signaling links uninhibited at step S70, as operated when failure happens at main signaling link, signal message transfer trial through signaling links at which failure happens is immediately stopped, procedure for protection of loss and disorder of signal messages is performed and signal message transfer is continuously processed through available auxiliary signaling links.

Figure 7:
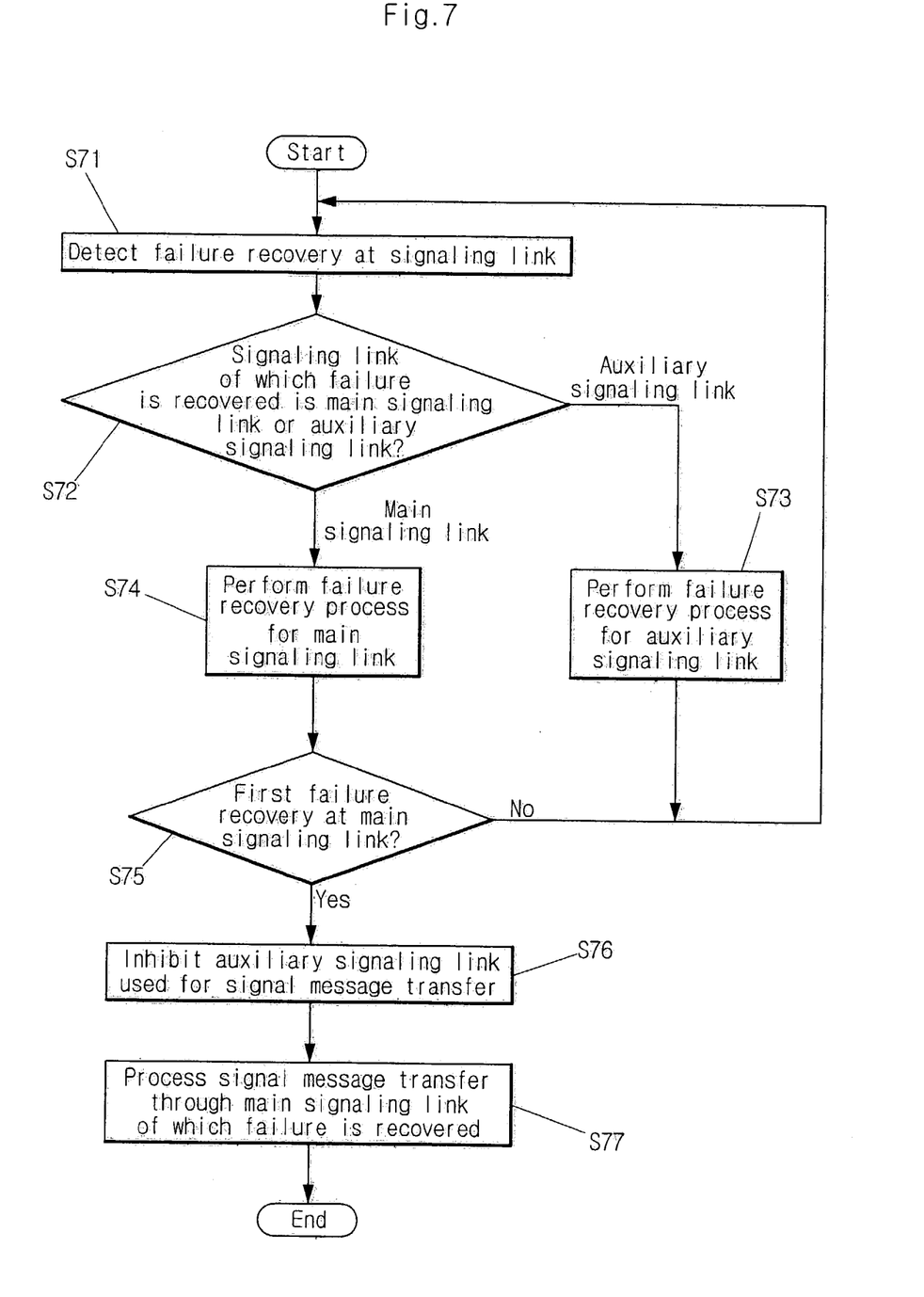
FIG. 7 illustrates a flow diagram of operations in a case where failure recovery at signaling link is detected while signal message transfer is processed.

FIG. 7 shows operations that may be performed when failure recovery is detected at signaling links while a signal message transfer is being processed.

If failure recovery is detected at a signaling link having a certain data link format, while a signal message transfer is processed through main signaling links or auxiliary signaling links (S71), a signaling network managing part 52 checks whether there are more signaling links for which a failure has been recovered are main signaling links or auxiliary signaling links (S72).

When the signaling links for which failure has been recovered are auxiliary signaling links, the signaling network managing part 52 performs a failure recovery process that makes the auxiliary signaling links for which failure has been recovered available (S73).

On the other hand, in a case where it is checked that the signaling links for which failure has been recovered are main signaling links (e.g., failure at main signaling links generally used for signal message transfer is recovered), the signaling network managing part 52 performs a failure recovery process that makes main signaling links of which failure is recovered available (S74). After performing the failure recovery process, the signaling network managing part 52 checks whether the failure recovery is the first failure recovery at main signaling links by asking the different data links processing part 53 whether the failure recovery is the first failure recovery at the main signaling links (S75).

When it is determined that the failure recovery is the first failure recovery at main signaling links (e.g., in a case where the failure that happened at main signaling links is recovered while signal message transfer is processed through auxiliary signaling links due to the failure that happened at all main signaling links), the signaling network managing part 52 immediately stops signal message transfer trial through auxiliary signaling links currently used for signal message transfer, inhibits the auxiliary signaling links again and continuously processes signal message transfer through main signaling links of which failure is recovered (S76, S77).

On the other hand, if the failure recovery is not the first failure recovery at main signaling links, the signal message transfer may be being currently processed through main signaling links. In that case, whether failure recovery at other signaling links is detected is continuously checked (S71).

According to the preferred embodiment of the present invention, if a signaling link set accommodates a plurality of signaling links having different data link formats, the signaling link set accommodates main signaling links, signaling links mainly used for signal message transfer, having data link format of high bandwidth; and a plurality of auxiliary signaling links, signaling links that have data link format of comparatively low bandwidth. Signal message transfer between adjacent signaling points is processed through main signaling links having data link format of high bandwidth during normal operation by inhibiting auxiliary signaling links having data link format of low bandwidth.

If signal message transfer through main signaling links becomes impossible due to failure that happens at all main signaling links accommodated in the signaling link set, having data link format of high bandwidth, signal message transfer is continuously processed by uninhibiting auxiliary signaling links in an inhibited status. At this time, signal message transfer is processed more efficiently by uninhibiting auxiliary signaling links having data link format of comparatively high bandwidth among auxiliary signaling links.

If failure recovery at main signaling links or at auxiliary signaling links having data link format of comparatively high bandwidth while signal message transfer is processed through auxiliary signaling links, signal message transfer is processed through the main signaling links or the auxiliary signaling links of which failure is recovered, by inhibiting again auxiliary signaling links used for signal message transfer.

Also, the foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications and variations will be apparent to those skilled in the art.

By performing signal message transfer through signaling links having a certain data link format using an inhibiting function or an uninhibiting function after accommodating signaling links having different data link formats in a signaling link set in SS7 network, it is possible to add signaling links having new data link format when necessary without removing signaling links having data link format used previously, according to the preferred embodiment of the present invention. Thus, it becomes possible to make a natural development of a signaling network possible, to boost a stability of signaling network by diversifying media for transfer simultaneously and to get economic effects in constructing a signaling network through re-using data links used previously.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of managing signaling links in a signaling link set of a signaling system No. 7 (SS7) network, comprising:

adding a first signaling link to a signaling link set of the SS7 network, said first signaling link having a data link format different from a data link format of a second signaling link previously included in the signaling link set; and processing signal message transfer between adjacent signaling points through the second signaling link.

2. The method of claim 1, wherein the second signaling link has a bandwidth different from a bandwidth of the first signaling link.

3. The method of claim 2, wherein the second signaling link has a bandwidth greater than a bandwidth of the first signaling link.

4. The method of claim 1, further comprising before said adding step:
determining whether a new signaling link may be added to the signaling link set by checking a number of signaling links in the signaling link set.

5. The method of claim 1, further comprising:
inhibiting the first link if the data format of the first signaling link is not currently being used for signal message transfer.

6. The method of claim 5, further comprising
uninhibiting the first signaling link when all signaling links in the signaling set having the data link format of the second signaling link become unavailable.

7. The method of claim 1, further comprising:
if a failure occurs at the second signaling link while signal message transfer between adjacent signaling points is processed, checking whether an available signaling link having the same data link format as the data format of the second signaling link exists in the signaling link set; and
when the available signaling link exists, processing signal message transfer between adjacent signaling points by sharing the signal messages among the available main signaling links.

8. The method of claim 7, further comprising:
if a failure occurs at the second signaling link while signal message transfer between signaling points is processed through the second signaling link, stopping signal message transfer trial through the second signaling link.

9. The method of claim 7, further comprising:
when the available signaling link does not exist, processing signal message transfer between the adjacent signaling points by uninhibiting the first signaling links.

10. The method of claim 9, further comprising:
if a plurality of signaling links having the data format of the first signaling link exists in the signaling set, then uninhibiting the signaling link in said plurality of signaling links, having a greatest bandwidth among said plurality of signaling links.

11. The method of claim 9, further comprising:
if a failure occurs in the first signaling link while signal message transfer between adjacent signaling points is processed through the first signaling link, stopping signal message transfer trial through the first signaling links;
checking whether the available signaling link has the same data link format as the data link format of the first signaling link; and,
when the available signaling link exists, processing signal message transfer between adjacent signaling points by sharing the signal messages among the available signaling link.

12. The method of claim 9, further comprising:
if a failure of the first or second signaling link is detected while signal message transfer between the adjacent signaling points is processed through the first signaling link among which the signal messages are shared, stopping signal message transfer trial by inhibiting the first signaling link among which the signal messages are shared; and processing signal message transfer between adjacent signaling points through the second signaling link or the first signaling links of which failure is recovered.

13. The method of claim 1, further comprising:
if a failure occurs at the first signaling link while signal message transfer between adjacent signaling points is processed through the first signaling link, performing a link failure process making the first signaling link unavailable.

14. The method of claim 1, further comprising:
if a failure recovery is detected while signal message transfer between adjacent signaling points is processed, checking whether the signaling link of which failure is recovered is the first signaling link or the second signaling link;
when the signaling link of which failure is recovered is the second signaling link, performing a failure recovery process and checking whether the failure recovery is the first recovery at the second signaling link; and,
when failure recovery is the first recovery at the second signaling link, inhibiting the first signaling link currently used for signal message transfer and processing signal message transfer between adjacent signaling points through the second signaling link of which failure is recovered.

15. The method of claim 1, further comprising:
if failure recovery at a signaling link is detected while signal message transfer between the adjacent signaling points is processed, checking whether the signaling link of which failure is recovered is the first signaling link or the second signaling link;
when the signaling link of which failure is recovered is the second signaling link, performing a failure recovery process and checking whether a signaling link currently used for signal message transfer corresponds to the first signaling link; and
when the signaling link currently used for signal message transfer is a first signaling link, inhibiting the first signaling link and processing signal message transfer between the adjacent signaling points through the second signaling link of which failure is recovered.

16. The method of claim 14, further comprising:
when the signaling link of which failure is recovered is the first signaling link, performing a failure recovery process making the first signaling link available.

17. The method of claim 15, further comprising:
when the signaling link of which failure is recovered is a first signaling link, performing a failure recovery process making the first signaling link available.

18. A system for managing signaling links in a signaling link set of a signaling system No. 7 (SS7) network, which includes a signal message processing part performing signal message routing, signal message discriminating and signal message distributing functions, comprising:
a different data links processing part which manages a plurality of signaling links having different data link formats, accommodated in a signaling link set used for signal message transfer between adjacent signaling points; and
a signaling network managing part, which adds signaling links having different data link formats to the signaling link set, activating the added signaling links, performing an inhibiting function and an uninhibiting function for signaling links having a certain data link format by cooperating with the different data links processing part, and performing a failure processing function for signaling links used for signal message transfer between adjacent signaling points.

19. The system of claim 18, wherein the different data links processing part performs:
   a signaling link checking function which checks whether one of the signaling links has a data link format to be inhibited; and
   a failure information managing function for signaling links used for signal message transfer.

20. The system of claim 15, wherein the different data links processing part manages:
   signaling link format information needed for performing the signaling link checking function;
   information indicative of a type of signaling link currently used for signal message transfer; and
   signaling link status information needed for performing the failure information managing function.

21. A signaling link set, comprising:
   a first signaling link; and
   a second signaling link,
   wherein the first and second signaling links have different data link formats.

22. The signaling link set of claim 21, wherein the different data link formats correspond to different bandwidths.

23. The signaling link set of claim 21, wherein the first signaling link is an activated link and the second signaling link is an inactive link.

24. The signaling link set of claim 21, wherein at least one of the first and second signaling links carry signaling messages.

25. An SS7 network, comprising:
   at least two signaling points; and
   a signaling link set connecting the two signaling points and including first and second signaling links having different data link formats.

26. The signaling link set of claim 25, wherein the different data link formats correspond to different bandwidths.

27. The signaling link set of claim 25, wherein the first signaling link is an activated link and the second signaling link is an inactive link.

28. The signaling link set of claim 25, wherein at least one of the first and second signaling links carry signaling messages.

29. A link management system, comprising:
   a manager which adds a first signaling link to a signaling link set which includes a second signaling link, said first and second signaling links having different data link formats; and
   a router which routes messages through one of the first signaling link and second signaling link.

30. The system of claim 29, wherein the different data link formats correspond to different bandwidths.

31. The system of claim 29, further comprising:
   a checking unit which determines whether the first signaling link has a data link format different from a data link format of the second signaling link.

32. The system of claim 29, further comprising:
   a processor which inhibits transfer of messages through the first signaling link.

33. The system of claim 32, further comprising:
   a detector which detects a fault in the second signaling link, said manager activating the first signaling link when said fault is detected.

34. The system of claim 33, further comprising:
   a fault recovery unit which corrects said fault in the second signaling link, said manager inhibiting the first signaling link and activating the second signaling link when said fault is corrected.

* * * * *